United States Patent
Schorpp et al.

(10) Patent No.: US 8,170,420 B2
(45) Date of Patent: May 1, 2012

(54) CHANGING HARDWARE SETTINGS BASED ON DATA PREAMBLE

(75) Inventors: Marcus Schorpp, Lempaala (FI); Markus Muller, Marl (DE); Dirk Uffmann, Haltern am See (DE)

(73) Assignee: Nokia Corporation, Espoo (FI)

( * ) Notice: Subject to any disclaimer, the term of this patent is extended or adjusted under 35 U.S.C. 154(b) by 869 days.

(21) Appl. No.: 12/206,231

(22) Filed: Sep. 8, 2008

(65) Prior Publication Data

US 2009/0238576 A1   Sep. 24, 2009

Related U.S. Application Data

(60) Provisional application No. 60/993,311, filed on Sep. 10, 2007.

(51) Int. Cl.
  *H04B 10/00*  (2006.01)
  *H04B 1/00*   (2006.01)

(52) U.S. Cl. .......................... 398/140; 375/146

(58) Field of Classification Search ............ 398/25, 398/115, 140–143; 375/147, 346, 361, 146, 375/308, 130, 142, 343, 355, 357; 370/252, 370/445, 458, 510; 341/50, 58, 95; 342/44, 342/50; 714/814
See application file for complete search history.

(56) References Cited

U.S. PATENT DOCUMENTS

| | | | | |
|---|---|---|---|---|
| 4,937,581 | A * | 6/1990 | Baldwin et al. | 340/10.52 |
| 5,132,687 | A * | 7/1992 | Baldwin et al. | 342/44 |
| 6,882,679 | B2 * | 4/2005 | Somayazulu et al. | 375/146 |
| 6,882,692 | B2 * | 4/2005 | Somayazulu | 375/343 |
| 7,218,670 | B1 * | 5/2007 | Lesea et al. | 375/226 |
| 2004/0233869 | A1 | 11/2004 | Uchida | 370/329 |
| 2005/0094647 | A1 | 5/2005 | Hata et al. | 370/395.52 |

FOREIGN PATENT DOCUMENTS

| | | |
|---|---|---|
| EP | 1 303 070 | 4/2003 |
| EP | 1 480 481 | 11/2004 |
| EP | 1 879 317 | 1/2008 |
| EP | 1 916 783 | 4/2008 |
| WO | WO 2006/126655 | 11/2006 |
| WO | WO 2007/015466 | 2/2007 |

OTHER PUBLICATIONS

Mobile Industry Processor Interface, M-PHY Modes Proposal—Markus Muller, Martti Voutilainen, Marcus Schorpp, Aug. 2007.
International Search Report issued on Apr. 6, 2009 in counterpart international application No. PCT/IB2008/053624 filed Sep. 8, 2008 (7 pages).

* cited by examiner

*Primary Examiner* — Loha Ben

(57) ABSTRACT

The present invention provides a new and unique method and apparatus for a new data speed switching scheme for a wired data interface. The method features receiving high-speed serial data over a physical link using a first coding scheme in a receiver; receiving a transmission mode change signal transmitted with sequential information about a change in a data transmission mode of the receiver using a second coding scheme and switching the data transmission mode of the receiver in response thereto. The data transmission modes may include at least one low-power mode where no data transmission is possible and the receiver is powered down. The at least one low-power mode may include two different power down states, each having different wake-up times. The data transmission modes may also include at least one high speed mode where data transmission is possible and the receiver is on. The at least one high speed mode may include several high speed modes, each having different data transmission rates.

48 Claims, 16 Drawing Sheets

Optical Link Between TX and RX

Receiver Rx 10

One or more modules 10a configured for receiving high-speed serial data over a physical link using a first coding scheme in a receiver One or more modules 10b configured for receiving a transmission mode change signal transmitted with sequential information about a change in a data transmission mode of the receiver using a second coding scheme One or more modules 10c configured for switching the data transmission mode of the receiver in response thereto

*FIG. 1a*

Transmitter Tx 20

One or more modules 20a configured for transmitting high-speed serial data over a physical link using a first coding scheme to a receiver One or more modules 20b configured for providing a transmission mode change signal transmitted with sequential information about a change in a data transmission mode of the receiver using a second coding scheme so as to enable the receiver to switch the data transmission mode in response thereto

*FIG. 1b*

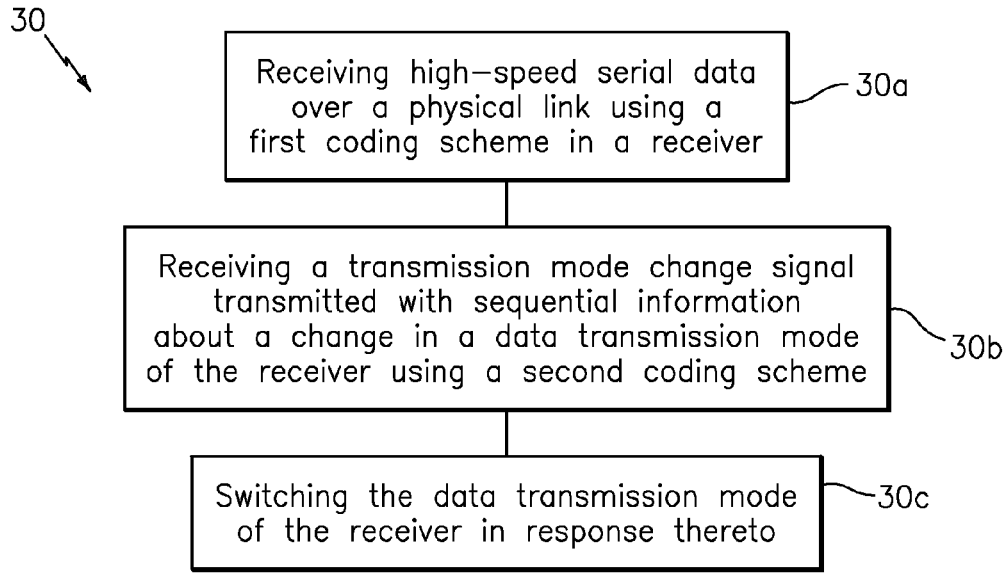
FIG. 2
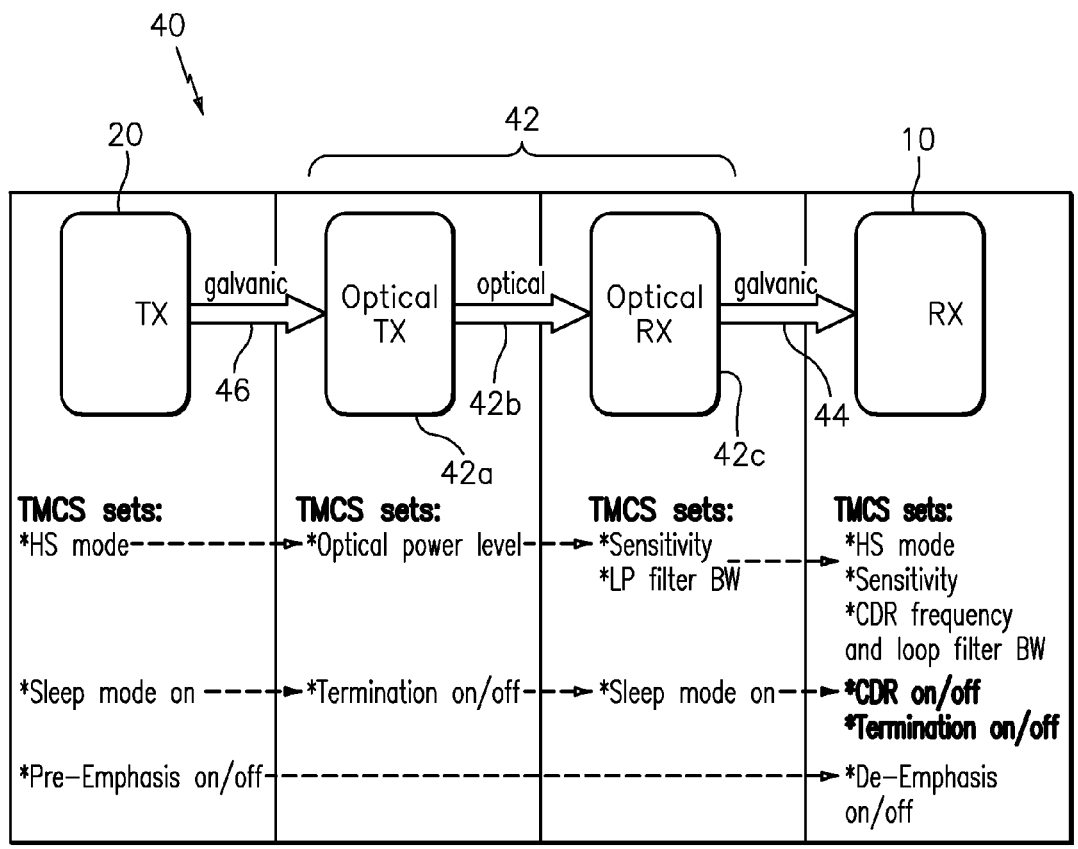
FIG. 3 : Optical Link Between TX and RX

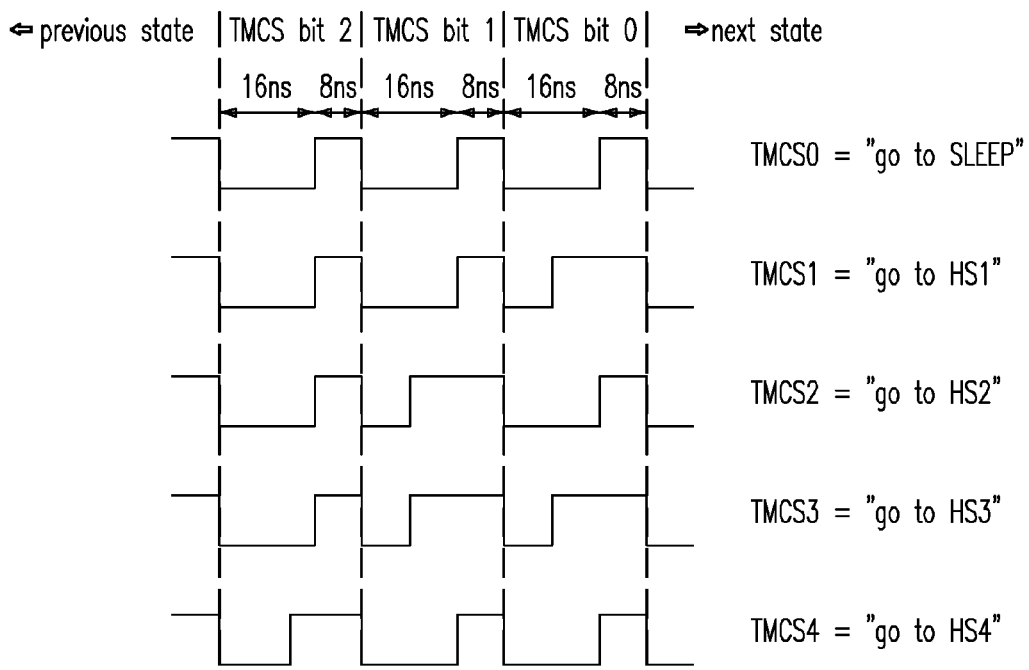
FIG. 4: example of three bit TMCS code (bit duration as example only)
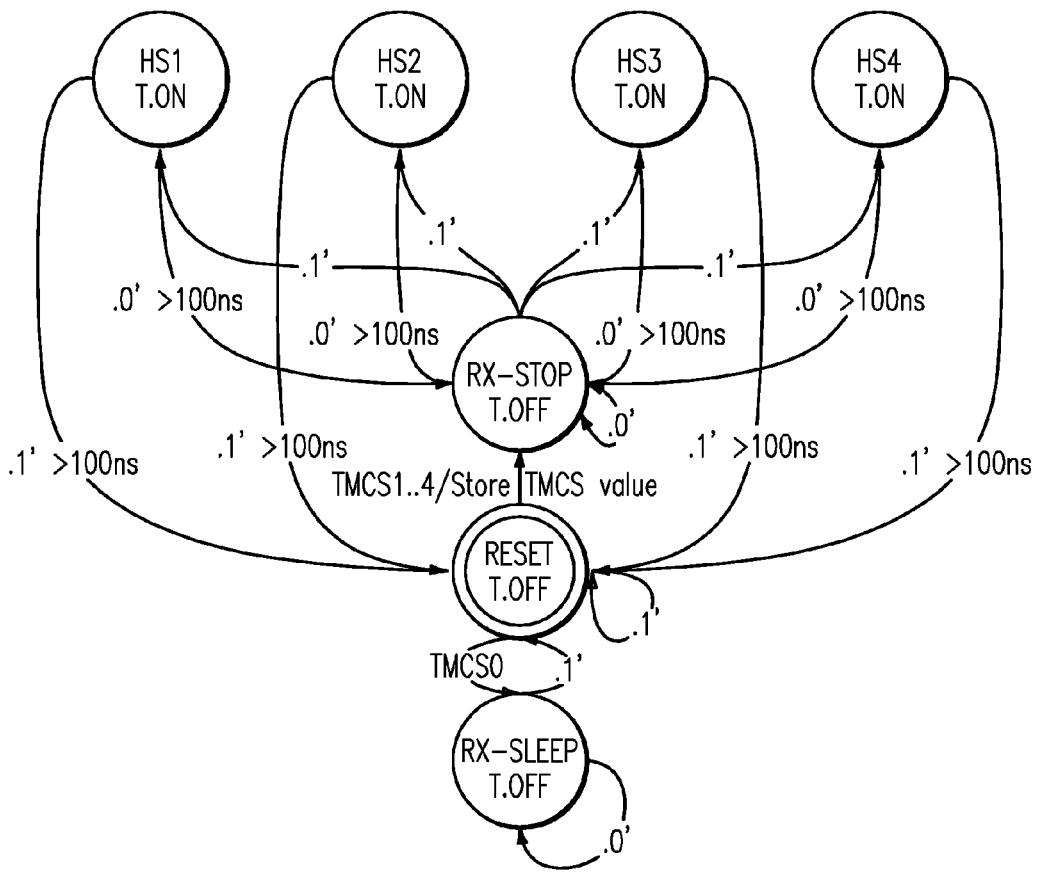
FIG. 5: State machine of RX. Timing values are exemplary

| | Speed [Mbps] | Differential line state | RX Termination | Possible next State | Exit condition | Implementation assumption (informative) | | | |
|---|---|---|---|---|---|---|---|---|---|
| | | | | | | TX PLL | TX Serializer | RX CDR | RX Deserializer |
| RESET | 0 | "1" | OFF | SLEEP/STOP | TMCS sequence | | | | |
| SLEEP | 0 | "0" | OFF | RESET | Line state="1" | OFF | OFF | OFF | OFF |
| STOP | 0 | "0" | OFF | HS1/HS2/HS3/HS4 | Line state="1" | ON | OFF | OFF | OFF |
| HS1 | 156 | XX | ON | STOP/RESET | "0" / "1" >100ns | ON | ON | ON | ON |
| HS2 | 1248 | XX | ON | STOP/RESET | "0" / "1" >100ns | ON | ON | ON | ON |
| HS3 | 2496 | XX | ON | STOP/RESET | "0" / "1" >100ns | ON | ON | ON | ON |
| HS4 | 4992 | XX | ON | STOP/RESET | "0" / "1" >100ns | ON | ON | ON | ON |

Modes / States overview

FIG. 6a

Optical RX HW settings

| State | Optical Input = Electrical Output | Next State | Optical Link, RX HW device | Setting | Note |
|---|---|---|---|---|---|
| SLEEP Power saving mode, branching regularly to Check_WU state: does not check optical input signal | "0" | Check_WU | Amplifier HS<br>Amplifier LS<br>HP Cutoff 100kHz<br>HP Cutoff 1MHz<br>HP Cutoff 5MHz<br>Wake-up timer | OFF<br>OFF<br>ON<br>OFF<br>OFF<br>ON | High-speed amplifier<br>Low-speed amplifier<br>High-pass (HP) filter setting; Could be OFF, if power saving achieved<br>Could be ON<br>Could be ON<br>Initiates regular change to state Check_WU, running on sleep clock or internal RC oscillator |
| Check_WU Regular wake-up to check on optical signal, which would initiate wake-up of link | "0" | SLEEP | Amplifier HS<br>Amplifier LS<br>HP Cutoff 100kHz<br>HP Cutoff 1MHz<br>HP Cutoff 5MHz<br>Wake-up timer | OFF<br>ON<br>ON<br>OFF<br>OFF<br>ON | Could be ON<br>Could be ON |
| Check_WU Regular wake-up to check on optical signal, which would initiate wake-up of link | "1" | RESET | Amplifier HS<br>Amplifier LS<br>HP Cutoff 100kHz<br>HP Cutoff 1MHz<br>HP Cutoff 5MHz<br>Wake-up timer | OFF<br>ON<br>ON<br>OFF<br>OFF<br>ON | Could be ON<br>Could be ON |
| RESET Stays in RESET as long as input signal is "1" | "1" | RESET | Amplifier HS<br>Amplifier LS<br>HP Cutoff 100kHz<br>HP Cutoff 1MHz<br>HP Cutoff 5MHz<br>Wake-up timer | OFF<br>ON<br>ON<br>OFF<br>OFF<br>OFF | |

FIG. 6c1

| | | SLEEP | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | |
|---|---|---|---|---|
| RESET<br>Branches to STOP when TMCS input detected and stores TMCS signal | TMCS0 | | | |
| RESET<br>Branches to STOP when TMCS input detected and stores TMCS signal | TMCS1/2/3/4 | STOP | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | TMCS values are stored in local memory |
| STOP<br>In STOP, the following state is known from stored TMCS value, so that the correct amplifier & filters could be switched on here to allow for short switch-on time | "0" | STOP | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | |
| STOP<br>"TMCS1" was stored in RESET state | "1" | HS1 | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | |

*FIG. 6c2*

| | | | |
|---|---|---|---|
| STOP<br>"TMCS2" or "TMCS3" was stored in RESET state | "1" | HS2-3 | Amplifier HS  ON<br>Amplifier LS  OFF<br>HP Cutoff 100kHz  OFF<br>HP Cutoff 1MHz  ON<br>HP Cutoff 5MHz  OFF<br>Wake-up timer  OFF | |
| STOP<br>"TMCS4" was stored in RESET state | "1" | HS4 | Amplifier HS  ON<br>Amplifier LS  OFF<br>HP Cutoff 100kHz  OFF<br>HP Cutoff 1MHz  OFF<br>HP Cutoff 5MHz  ON<br>Wake-up timer  OFF | |
| HS1<br>156Mb/s | Data | HS1 | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | Could be ON<br>Could be ON |
| HS1<br>156Mb/s | "0" >100ns | STOP | Amplifier HS  OFF<br>Amplifier LS  ON<br>HP Cutoff 100kHz  ON<br>HP Cutoff 1MHz  OFF<br>HP Cutoff 5MHz  OFF<br>Wake-up timer  OFF | Could be ON<br>Could be ON |

FIG. 6c3

| HS1 156Mb/s | "1" >100ns | RESET | Amplifier HS<br>Amplifier LS<br>HP Cutoff 100kHz<br>HP Cutoff 1MHz<br>HP Cutoff 5MHz<br>Wake-up timer | OFF<br>ON<br>ON<br>OFF<br>OFF<br>OFF | Could be ON<br>Could be ON |
|---|---|---|---|---|---|
| HS2-3 1.25Gb/s or 2.5Gb/s | Data | HS2-3 | Amplifier HS<br>Amplifier LS<br>LP Cutoff 100kHz<br>LP Cutoff 1MHz<br>LP Cutoff 5MHz<br>Wake-up timer | ON<br>OFF<br>OFF<br>ON<br>OFF<br>OFF | Could be ON |
| HS2-3 1.25Gb/s or 2.5Gb/s | "0" >100ns | STOP | Amplifier HS<br>Amplifier LS<br>LP Cutoff 100kHz<br>LP Cutoff 1MHz<br>LP Cutoff 5MHz<br>Wake-up timer | ON<br>OFF<br>OFF<br>ON<br>OFF<br>OFF | Could be ON |

FIG. 6c4

| | | | |
|---|---|---|---|
| HS2-3<br>1.25Gb/s or 2.5Gb/s | "1" >100ns | RESET | Amplifier HS    ON<br>Amplifier LS    OFF<br>LP Cutoff 100kHz    OFF<br>LP Cutoff 1MHz    ON<br>LP Cutoff 5MHz    OFF<br>Wake-up timer    OFF | Could be ON |
| HS4<br>5Gb/s | Data | HS4 | Amplifier HS    ON<br>Amplifier LS    OFF<br>LP Cutoff 100kHz    OFF<br>LP Cutoff 1MHz    ON<br>LP Cutoff 5MHz    OFF<br>Wake-up timer    OFF | |
| HS4<br>5Gb/s | "0" >100ns | STOP | Amplifier HS    ON<br>Amplifier LS    OFF<br>LP Cutoff 100kHz    OFF<br>LP Cutoff 1MHz    OFF<br>LP Cutoff 5MHz    ON<br>Wake-up timer    OFF | |
| HS4<br>5Gb/s | "1" >100ns | RESET | Amplifier HS    ON<br>Amplifier LS    OFF<br>LP Cutoff 100kHz    OFF<br>LP Cutoff 1MHz    OFF<br>LP Cutoff 5MHz    ON<br>Wake-up timer    OFF | |

*FIG. 6c5*

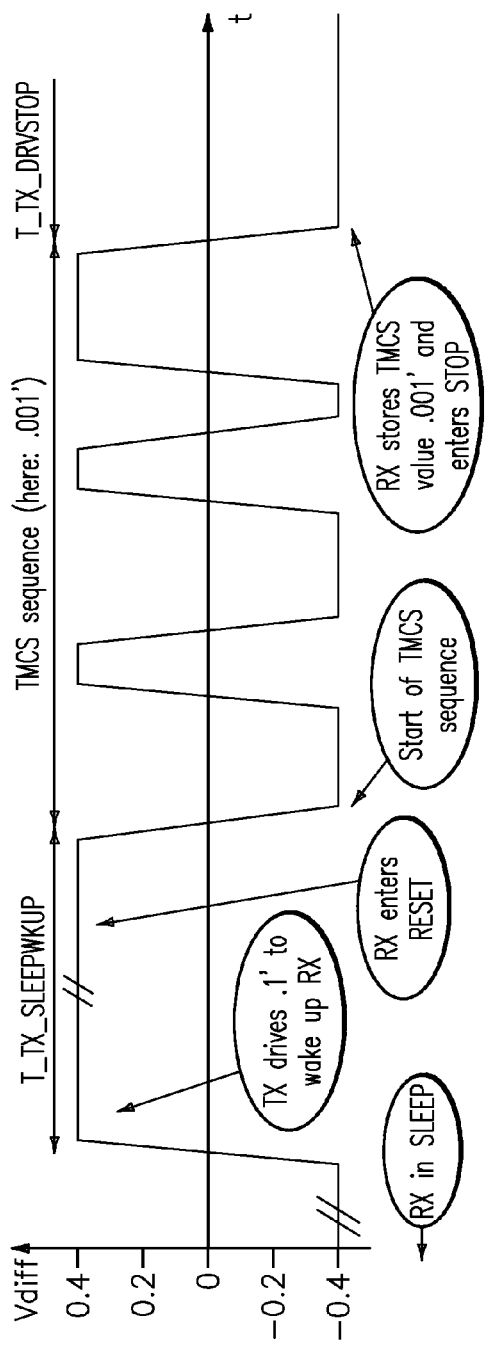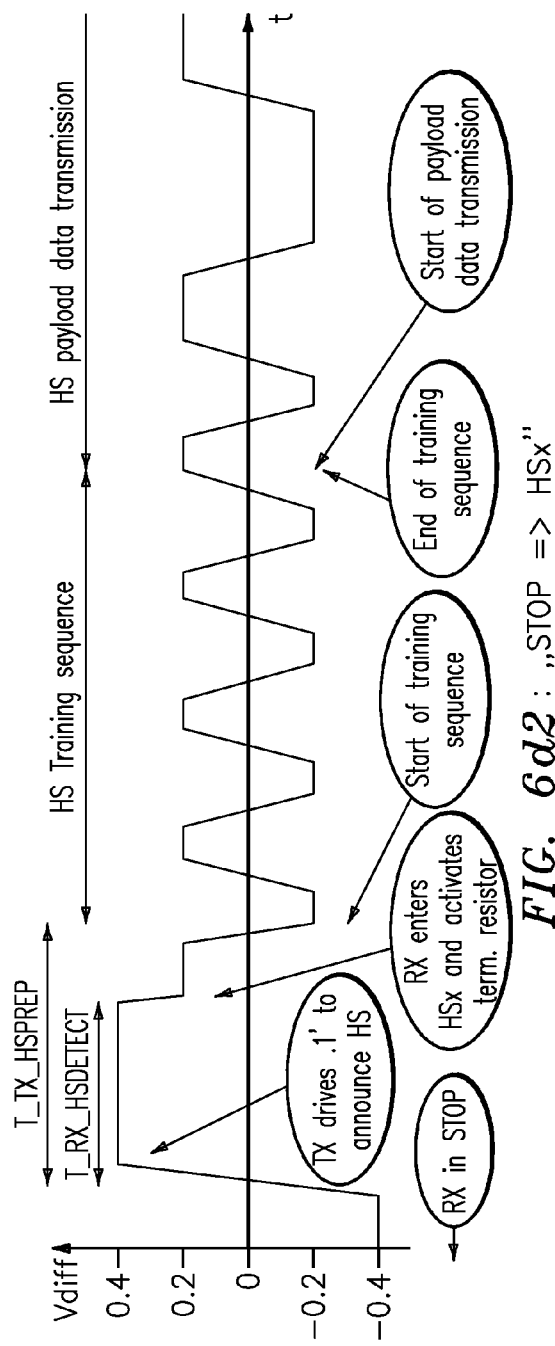

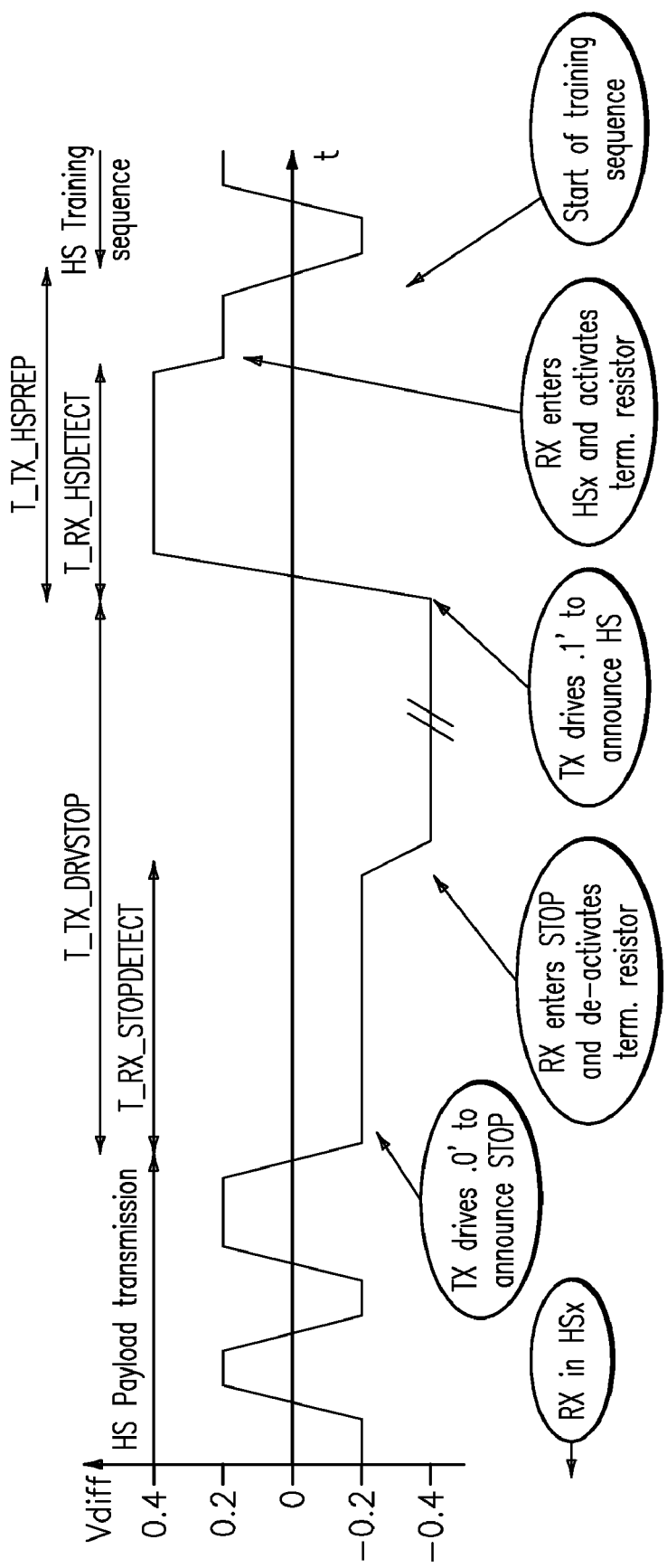
FIG. 6d3 : „HSx => STOP => HSx"

Modes / States overview

| | Speed [Mbps] | Differential line state | RX Termination | Possible next State | Exit condition | Implementation assumption (informative) | | | |
|---|---|---|---|---|---|---|---|---|---|
| | | | | | | TX PLL | TX Serializer | RX CDR | RX Deserializer |
| SLEEP | 0 | "0" | OFF | STOP | Line state="1" | OFF | OFF | OFF | OFF |
| STOP | 0 | "0" | OFF | HS1/HS2/HS3/HS4 | Line state="1" | ON | OFF | OFF | OFF |
| HS1 | 156 | XX | ON | STOP/SLEEP | k-code | ON | ON | ON | ON |
| HS2 | 1248 | XX | ON | STOP/SLEEP | k-code | ON | ON | ON | ON |
| HS3 | 2496 | XX | ON | STOP/SLEEP | k-code | ON | ON | ON | ON |
| HS4 | 4992 | XX | ON | STOP/SLEEP | k-code | ON | ON | ON | ON |

FIG. 7a

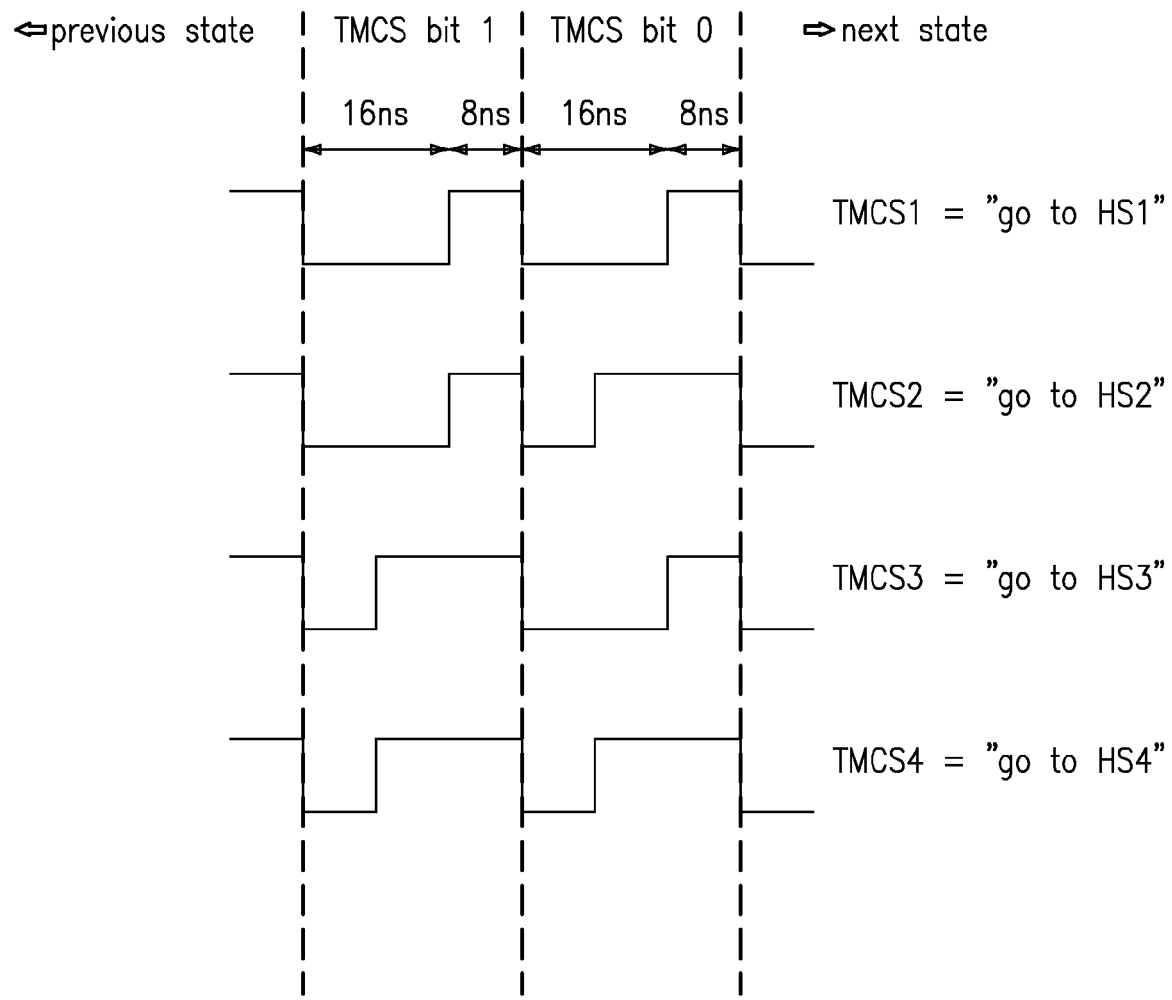
FIG. 7d : TMCS Encoding

CHANGING HARDWARE SETTINGS BASED ON DATA PREAMBLE

CROSS REFERENCE TO RELATED APPLICATION

This application claims benefit to provisional patent application Ser. No. 60/993,311, filed 10 Sep. 2007, which is hereby incorporated by reference in its entirety.

BACKGROUND OF THE INVENTION

1. Field of the Invention

The present application relates to a new data speed switching scheme for a high-speed serial data interface.

2. Description of Related Art

Known wired data interfaces can provide a layered protocol for interconnecting devices and components within mobile systems such as cellular telephones, handheld computers, digital cameras, etc., and allow these devices and components to exchange data at high data rates, at low pin counts and at low energy per transferred bit. Such wired data interfaces can also provide general-purpose features that are applicable for a wide range of component types (e.g. application processors, coprocessors, modems, peripherals) and different types of data traffic (e.g., control messages, bulk data transfer, packetized streaming).

Known wired data interfaces can use different data transmission speed modes, and have switching schemes between both such modes, which may have to be done fast.

By way of example, there exists several known high-speed serial links like PCI Express, Serial ATA and others. Also those standards provide different power modes, but switching between those takes usually a longer amount of time. There is a need to be able to make fast mode transitions, to make efficient power savings between data transmission bursts possible.

SUMMARY OF THE INVENTION

The present invention provides a new and unique method and apparatus for a new data speed switching scheme for a wired data interface.

The method features receiving high-speed serial data over a physical link using a first coding scheme in a receiver; receiving a transmission mode change signal transmitted with sequential information about a change in a data transmission mode of the receiver using a second coding scheme and switching the data transmission mode of the receiver in response thereto.

The data transmission modes may include at least one low-power mode where no data transmission is possible and the receiver is powered down. The at least one low-power mode may include two different power down states, each having different wake-up times.

The data transmission modes may also include at least one high speed mode where data transmission is possible and the receiver is on. The at least one high speed mode may include several high speed modes, each having different data transmission rates.

The first coding scheme may be a non-return-to-zero coding scheme, and the second coding scheme may be a return-to-zero coding scheme, or some combination thereof, and where the change in the data transmission mode depends on a sequence transmitted in transmission mode change signals. In operation, the sequence of transmission mode change signals may only be sent when the speed of the data transmission mode needs to be changed.

The method also features coupling the receiver to an optical receiver that forms part of an optical link, and decoding the transmission mode change signal with the optical receiver.

The change may include one or more of the following transitions:
changing from a RESET state to a STOP state;
changing from the STOP state to a high speed state if the logical line state goes to a pre-defined logical value, e.g. '1'; or
the HS state to the STOP or RESET state when the logical value, e.g. a logical '0' or '1' signal, is longer than a specified time. The specified time may be defined to be longer than a maximum run length of a used line coding. The target state indicated by an transmission mode change signal may also be stored.

Hardware settings may be changed based on the information transmitted in the transmission mode change signal. The transmission mode change signal may be transmitted as a pulse width modulation signal. The hardware settings may include a setting for adjusting the sensitivity of the receiver.

The at least one low-power mode may include a stop state that is an intermediate power saving mode which can be entered from and exited to one or more of several high speed modes. The stop state can be entered from and exited to the one or more of several high speed modes without a transmission mode change signal. Also the stop state can be entered from and exited to the one or more of several high speed modes by the receiver by observing the line state.

The receiver may include one or more digital counters or analog circuits for processing the transmission mode change signal, and/or may form part of a data interface implementation, including one for a mobile system such a cellular telephone, handheld computer or digital camera.

The receiver may also form part of a chip that is integrated into a high-speed serial data transmission system.

The apparatus may take the form of a receiver featuring one or more modules configured for receiving high-speed serial data over a physical link using a first coding scheme and for receiving a transmission mode change signal transmitted with sequential information about a change in a data transmission mode of the receiver using a second coding scheme and switching the data transmission mode of the receiver in response thereto.

The apparatus may take the form of a transmitter featuring one or more modules configured for providing high-speed serial data over a physical link using a first coding scheme in a receiver and for also providing a transmission mode change signal transmitted with sequential information about a change in a data transmission mode of the receiver using a second coding scheme so as to enable the receiver to switch the data transmission mode in response thereto.

The apparatus may take the form of a system featuring such a receiver and such a transmitter.

The apparatus may also take the form of a computer program product with a program code, which program code is stored on a machine readable medium, for carrying out the steps of a method comprising receiving high-speed serial data over a physical link using a first coding scheme in a receiver; receiving a transmission mode change signal transmitted with sequential information about a change in a data transmission mode of the receiver using a second coding scheme and switching the data transmission mode of the receiver in response thereto, when the computer program is run in such a module in such a receiver, as well as a computer program product with a program code, which program code is stored on a machine readable medium, for carrying out the steps of a method comprising providing such high-speed serial data over such a physical link using such a first coding scheme in a receiver and providing such a transmission mode change signal transmitted with sequential information about such a change in such a data transmission mode of such a receiver using a second coding scheme so as to enable the receiver to switch the data transmission mode in response thereto.

The apparatus may also take the form of a combination of means for receiving high-speed serial data over a physical link using a first coding scheme in a receiver and for receiving a transmission mode change signal transmitted with sequential information about a change in a data transmission mode of the receiver using a second coding scheme in combination with means for switching the data transmission mode of the receiver in response thereto.

In summary, the present invention relates to providing different usage of the transmission mode change signal (TMCS) in different data transceivers (optical/electrical transceivers) and when and how the transmission mode change signal is integrated into the data flow. The transmission mode change signal may be used in data transmission systems to control the settings of the transmitters and receivers. For example, the transmission mode change signal can indicate the start of an increased data transfer speed so that the receiver can switch to higher data transfer speed settings or the transmission mode change signal indicates the start of a reduced speed or no further data transmission so that the receiver can switch to the respective low power/speed mode.

For the design of the wired data interface, the idea is to integrate also optical transmission paths and provide solutions for controlling the electrical as well as the optical transceivers within this transmission path in the most efficient way without e.g. compromising the high transmission speed within any of the involved interfaces.

The present invention includes two main ideas for the usage of the transmission mode change signal:

(1) The transmission mode change signal is sent only when the speed mode shall be changed, i.e. once a new transmission mode change signal is sent out the addressed transceivers change the settings according to the transmission mode change signal information and keep the settings for subsequent data packets unless a new transmission mode change signal is received.

(2) The transmission mode change signal informs the involved electrical wired data interface as well the optical transceivers on the transmission path about mode changes but the optical transceivers (which mainly pass through the digital information without analyzing the data, at least in high speed modes) use the information in a different way than the electrical receivers which contains the needed equipment for analyzing the received data, i.e. the optical transmitters only switch to another optical power level while the electrical receiver changes the settings for the HS mode including the sensitivity and the clock and data recovery frequency and loop filter bandwidth.

Further, by way of example, the transmission mode change signal may be sent with a 3-bit coded pulse width modulation (PWM) coding which is very robust and fault tolerant and can be easily recognized by all kind of involved transceivers with digital counters or analog circuits.

The following points of interest regarding the present invention are also noted:

1) The transition time between a high speed (HS) mode and STOP (and back) is likely to be minimized. This may be very important for system efficiency, because the link is enabled to utilize even short transmission gaps to save power in the STOP state.

2) There may be no need to do data decoding (e.g. 8b10b k-codes) to be able to switch between modes—important for optical links.

3) The easy-to-decode, but slow signalling of the transmission mode change signal is likely not to harm system efficiency, because the transmission mode change signal needs only to be sent when changing from one HS mode to another HS mode or when going to the very-low-power state (SLEEP). These changes occur only seldom compared to the HS-STOP-HS transition, and are allowed to consume more time.

BRIEF DESCRIPTION OF THE DRAWING

The drawing includes the following Figures, which are not necessarily drawn to scale:

FIG. 1a shows a receiver according to some embodiments of the present invention.

FIG. 1b shows a transmitter according to some embodiments of the present invention.

FIG. 2 shows a flowchart of the basic steps of the method according to some embodiments of the present invention.

FIG. 3 shows an optical link in-between a transmitter and receiver according to some embodiments of the present invention.

FIG. 4 shows an example of a three bit transmission mode change signal (bit duration as example only) according to some embodiments of the present invention.

FIG. 5 shows a diagram of a state machine of a receiver having exemplary timing values according to some embodiments of the present invention.

FIG. 6a shows a diagram of a modes/states overview according to some embodiments of the present invention.

FIGS. 6c1, 6c2, 6c3, 6c4 and 6c5 show optical RX hardware settings according to some embodiments of the present invention.

FIG. 6d1 shows a timing diagram for a SLEEP to STOP transition according to some embodiments of the present invention.

FIG. 6d2 shows a timing diagram for a STOP to HSx transition according to some embodiments of the present invention.

FIG. 6d3 shows a timing diagram for an HSx to STOP to HSx transition according to some embodiments of the present invention.

FIG. 7a shows a diagram of a modes/states overview according to some embodiments of the present invention.

FIG. 7d shows an example of the transmission mode change signal encoding according to some embodiments of the present invention.

BEST MODE OF THE INVENTION

FIG. 1a

Receiver

Figure 6B:
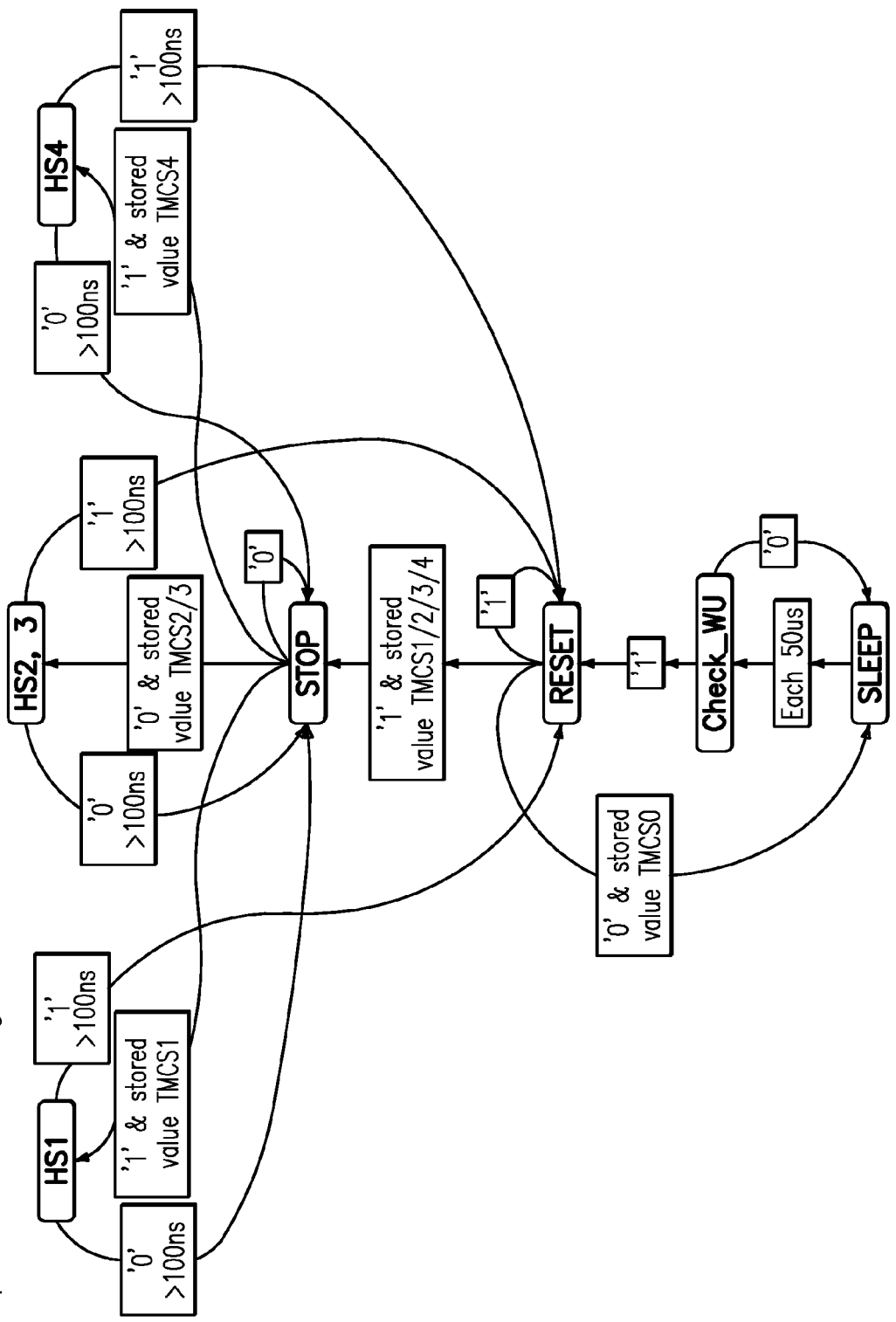
FIG. 6b shows an optical RX state diagram according to some embodiments of the present invention.

FIG. 1a shows a block diagram of a receiver 10 according to some embodiments of the present invention. The receiver 10 features one or more modules 10a, 10b and/or 10c configured for receiving high-speed serial data over a physical link using a first coding scheme in a receiver and for receiving a transmission mode change signal transmitted with sequential information about a change in a data transmission mode of the receiver using a second coding scheme and switching the data transmission mode of the receiver in response thereto. The receiver 10 may form part of a system like that shown in FIG. 3, in which a transmitter such as Tx (see also FIG. 1b) provides the transmission mode change signal, consistent with that discussed in detail below.

In operation, a lower power (LP) mode would not be used at all, but instead one "slow" high speed (HS) (e.g. 156 Mb/s) mode and several fast HS modes would be used, as follows:
  Two power-down states: SLEEP, STOP
    Both states are basically the same
      No data transmission possible
      Differential '0' on the link
      RX termination OFF
    Only difference is wake-up time
      From STOP to HS approx. 100 ns
      From SLEEP to STOP approx. 1 ms
  Up to four 'high-speed' modes: HS1, HS2, HS3, HS4
    All modes are method-wise the same
      Data transmission with 8b10b coding
      Differential signaling with RX termination ON
    Only difference is data rate
      For example HS1: 156 Mbps/HS2: 1248 Mbps/HS3: 2496 Mbps/HS4: 4992 Mbps According to some embodiment of the present invention, each implementation would have at least provided HS1, and other modes would be optional, although the scope of the invention is not intended to be limited to the same.

Switching between modes may be done using, for example, a transmission mode change signal in the form of pulse width modulation (PWM) signalling. The transmission mode change signal is easy to detect by oversampling or analog circuits, and could therefore be implemented in simple optical links, as opposed to high-speed clock and data recovery (CDR). The transmission mode change signal does not have to form part of the payload data. While the present invention is described by way of example using a transmission mode change signal in the form of pulse width modulation signalling, the scope of the invention is not intended to be limited to only using pulse width modulation. For example, embodiments are envisioned using other types or kinds of coding for the transmission mode change signal either now known or later developed in the future, including Manchester coding or pulse position modulation (PPM). The scope of the invention is also intended to be broad enough to include return-to-zero coding for mode changes, as well as non return-to-zero coding for high speed data transmission.

A further aspect of the present invention is to change hardware settings based on the transmission mode change signal, which is not part of the payload data. The transmission mode change signal bit durations can be adjusted to the current need (e.g. implementation). The transmission mode change signal bit duration does not affect the payload data speed and can therefore be optimized separately.

For example, the receiver 10 of such a transmission mode change signal could switch its receiver sensitivity according to the transmission mode change signal, when the transmission mode change signal indicated the high speed data speed that will be used in the next high speed state. This could result in power dissipation optimized for each transmission speed. Also optional receiver filters could be switched based on the transmission mode change signal, allowing for high speed modes with and without equalization changeable during runtime.

The scope of the invention is also not intended to be limited to the functionality of modules 10a, 10b and/or 10c being performed in one module or two modules, as shown.

FIG. 1b

TX

FIG. 1b shows a block diagram of a transmitter (TX) 20 featuring one or more modules 20a and/or 20b configured for providing such high-speed serial data over such a physical link using the first coding scheme and for providing such a transmission mode change signal transmitted with information about such a change in such a data transmission mode of such a receiver 10 using the second coding scheme and for transmitting data in the data transmission mode to the receiver. Consistent with that discussed above, the transmitter 20 may form part of the system like that shown in FIG. 3, in which the receiver Rx (see also FIG. 1a) receives the transmission mode change signal.

The scope of the invention is also not intended to be limited to the functionality of modules 20a and/or 20b be performed in one module or two modules, as shown.

FIG. 2

FIG. 2 shows a flowchart 30 with basic steps 30a, 30b and 30c of a method according to some embodiments of the present invention, including the step 30a for receiving high-speed serial data over such a physical link using the first coding scheme and the step 30b for receiving a transmission mode change signal containing information about a change in a data transmission mode of such a receiver 10 using a second coding scheme; and a step 30c for switching the data transmission mode of the receiver in response thereto. The flowchart 30 of the method is shown by way of example and is also intended to include other steps consistent with that shown and described herein.

FIG. 3

FIG. 3 shows by way of example a system 40 according to the present invention having an optical link 42 arranged in-between an RX such as 10 in FIG. 1a and TX such as 20 in FIG. 1b. As shown, the optical link 42 includes an optical TX 42a, an optical coupling 42b and an optical RX 42c, which are all elements that are known in the art. The RX 10 is coupled by a galvanic link 44 to the optical RX 42c, and the TX 20 is coupled by a galvanic link 46 to the optical TX 42a.

In this type of application, the optical links can be used to interconnect the TX 20 and the RX 10 instead of long galvanic links. In such a setup, only short galvanic links 44 and 46 remain between the TX 20 and the optical TX 42a, and the optical RX 42c and the RX 10, respectively. The transmission mode change signal can be simply decoded by such an optical link 42 and can also be used to switch the settings of the optical TX 42a and optical RX 42c, e.g. the optical TX power, the optical RX low-pass filter frequency or sensitivity, etc. The scope of the invention is not intended to be limited to the number or type of hardware settings switched by the transmission mode change signal. Consistent with that described herein, the optical devices 42a and 42c would not need clock and data recovery to detect the correct settings.

By way of example, the modes can change as follows. The RX 10 in a RESET state could transitioned upon reception of the transmission mode change signal to a STOP state, where the target state indicated by the transmission mode change signal is stored. The STOP state to high speed state transition is then done as soon as the logical line state goes to '1'. Switching from the high speed state to the STOP or RESET state will be performed upon a '0' or '1' signal longer than a specified time. This time must be defined longer than the maximum runlength of the used line coding (in the example of FIG. 2, this time is 100 ns).

It is important to note that the scope of the invention is intended to include the transceiver and the optical transceiver taking the form of "intelligent" transceivers in the transmission path that is enabled to decode the data on the transmission line even in high speed modes, and "Non-intelligent transceivers" in the transmission line, where the mode of the transceivers needs to be changed depending on the selected transmission mode. The "non-intelligent transceivers" would not be enabled to decode the data content, but just pass the data signal through to the next transceiver. Besides optical transceivers, the scope of the invention is e.g. intended to include electrical amplifiers in the transmission path where the purpose is just to increase the data signal level for passing the data over a longer distance to the next receiver. These type of "non intelligent transceivers" function as so-called "Media converter".

FIG. 4

Example of 3 Bit Transmission Mode Change Signal

FIG. 4 shows an example of a three bit transmission mode change signal (bit duration as example only) according to some embodiments of the present invention. As shown, this transmission mode change signal is 3 bits long (needed to incorporate "go to SLEEP" plus 4 high-speed modes).

This example shows the 3 bit sequence using, by way of example, a type of pulse width modulation coding. The receiver 10 (FIGS. 1*a* and 3) may be implemented with digital counters or analog circuits, e.g. in module 10*a*. The proposed coding in FIG. 3 is shown by way of example because it is very tolerant to frequency variation. However, the scope of the invention is intended to include other types or kinds of PWM signalling and/or transmission mode change signal coding either now known or later developed in the future within the spirit of the present invention. In operation, the transmission mode change signal just announces the main mode to come (HS1 . . . 4, SLEEP). After the transmission mode change signal, the normal training sequence of the high speed code (e.g. 010101 patterns) will begin or the circuitry will be switched, for example, to SLEEP mode.

FIG. 5

The State Machine

FIG. 5 shows a diagram of a state machine of the receiver 10 (see FIGS. 1 and 3) having exemplary timing values according to some embodiments of the present invention.

As shown in FIG. 5, from the RESET state, a 3 bit transmission mode change signal sequentially tells the receiver 10 to which mode it should go (e.g. HS2). The receiver 10 will store this mode (e.g. HS2), so that from that point in time on it can switch between HS2 and STOP easily by observing the line state. If the logical value "1" is for longer than 100 ns, it goes to HS2. If logical value "0" is for longer than 100 ns, then the mode returns to STOP, and so on.

If the receiver should go to a different HS mode (e.g. HS1) or SLEEP, this must be performed by transitioning through the RESET state.

In summary the present invention has two main aspects, as follows:

(1) A method to switch between several high-speed modes (HS1 . . . 4) and different low-power modes (STOP, SLEEP) in a new and unique way. The transmitter such as 20 (FIGS. 1*b* and 3) uses transmission mode change signals to announce one of the modes {HS1, HS2, HS3, HS4, SLEEP} as the next main mode to the receiver 10 (FIGS. 1*a* and 3). The transmission mode change signal itself may be optimized for easy detection and decoding, not for fast transmission. The STOP state is considered an intermediate power-saving mode, which can be entered from (and exited to) HS1 . . . 4 without the transmission mode change signal. Instead, these transitions (which need to be fast for system efficiency) can be identified by the receiver by simply observing the line state. This is shown in the state diagram in FIG. 5.

(2) A method to utilize the information contained in the transmission mode change signal by the receiver and also additional intermediate devices, like the optical transmitter 42*a* and optical receiver 42*c* of FIG. 3, to adapt their internal behaviour to the newly announced mode. This is possible even for simple devices, which are not able to analyze the high-speed data stream of HS1 . . . 4 modes, because the transmission mode change signal is sent in a simple-to-decode manner with a lower speed.

FIGS. 6*a*-6*c*

FIG. 6*a* show a diagram or chart of a modes/states overview that provides a simplified scheme having a faster STOP-to-HS transition. The modes or states include RESET, SLEEP, STOP, HS1, HS2, . . . , HS4. As shown, the characteristic of the modes/states include: speed (Mbps), differential line state, RX termination resistor, possible next state and exit condition, and the implementation assumptions are provided for informative reasons and may include one or more of the following: TX PLL, TX serialization, RX CDR or RX deserialization.

FIG. 6*b* shows an optical RX state diagram according to this embodiments of the present invention, and FIG. 6*c* shows optical RX hardware settings according to this embodiments of the present invention.

FIG. 6*c* shows by way of example RX hardware settings according to some embodiments of the present invention.

FIGS. 6*d*1 to 6*d*3 show timing diagrams for a SLEEP to STOP transition, for a STOP to HSx transition and for an HSx to STOP to HSx transition according to some embodiments of the present invention.

FIGS. 7*a*-7*d*

FIGS. 7*a*-7*d* show an alternative embodiment to that shown above according to some embodiments of the present invention.

In particular, FIG. 7*a* shows a diagram or chart of a modes/states overview. The modes or states include SLEEP, STOP, HS1, HS2, . . . , HS4. The characteristic of the modes/states include: speed (Mbps), differential line state, RX termination resistor, possible next state and exit condition. The implementation assumptions are provided for informative reasons and may include one or more of the following: TX PLL, TX serialization, RX CDR or RX deserialization.

Figure 7B:
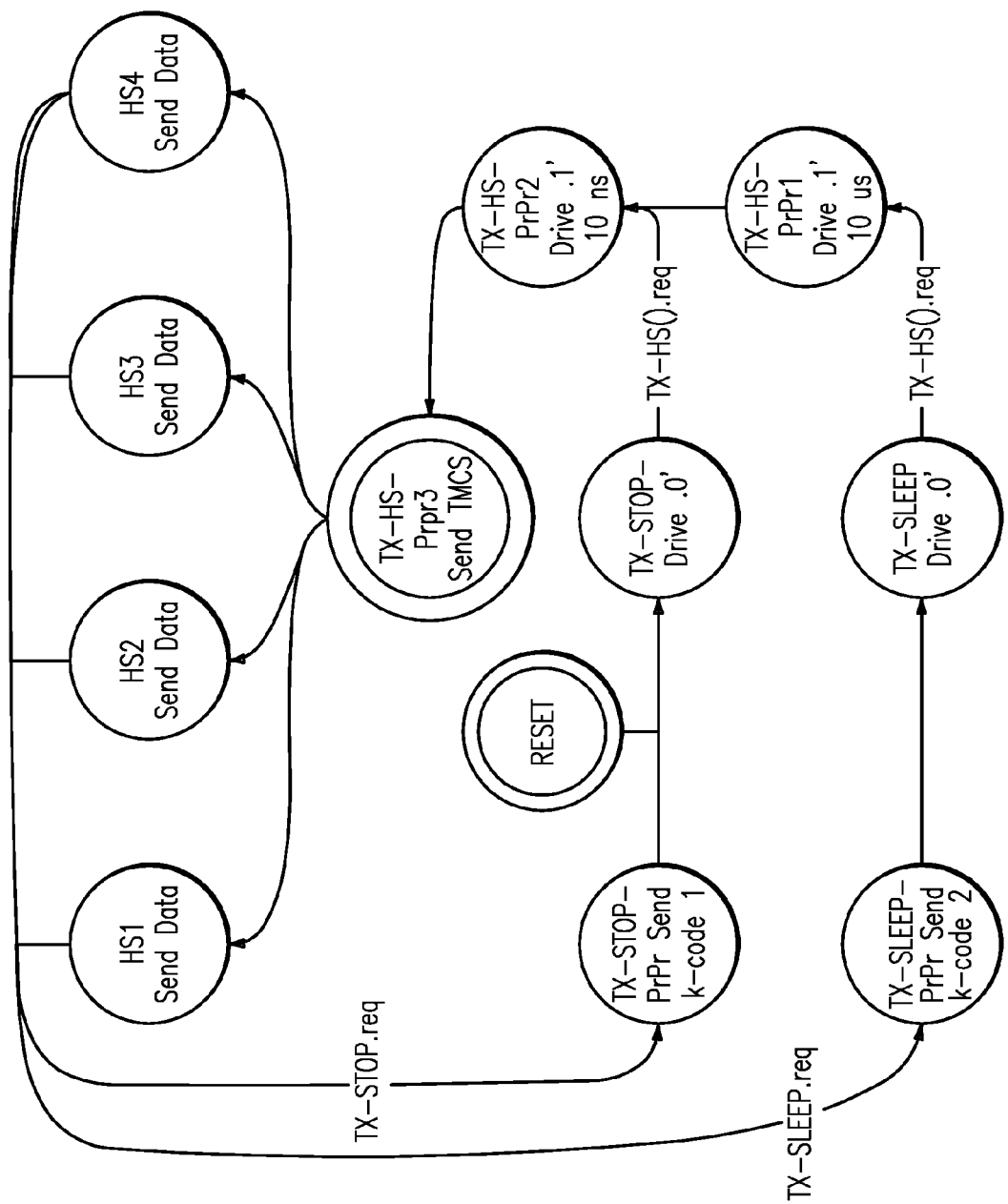
FIG. 7b shows a transmitter state diagram according to some embodiments of the present invention.

FIG. 7b shows a TX state diagram for the modes/states shown in FIG. 7a.

Figure 7C:
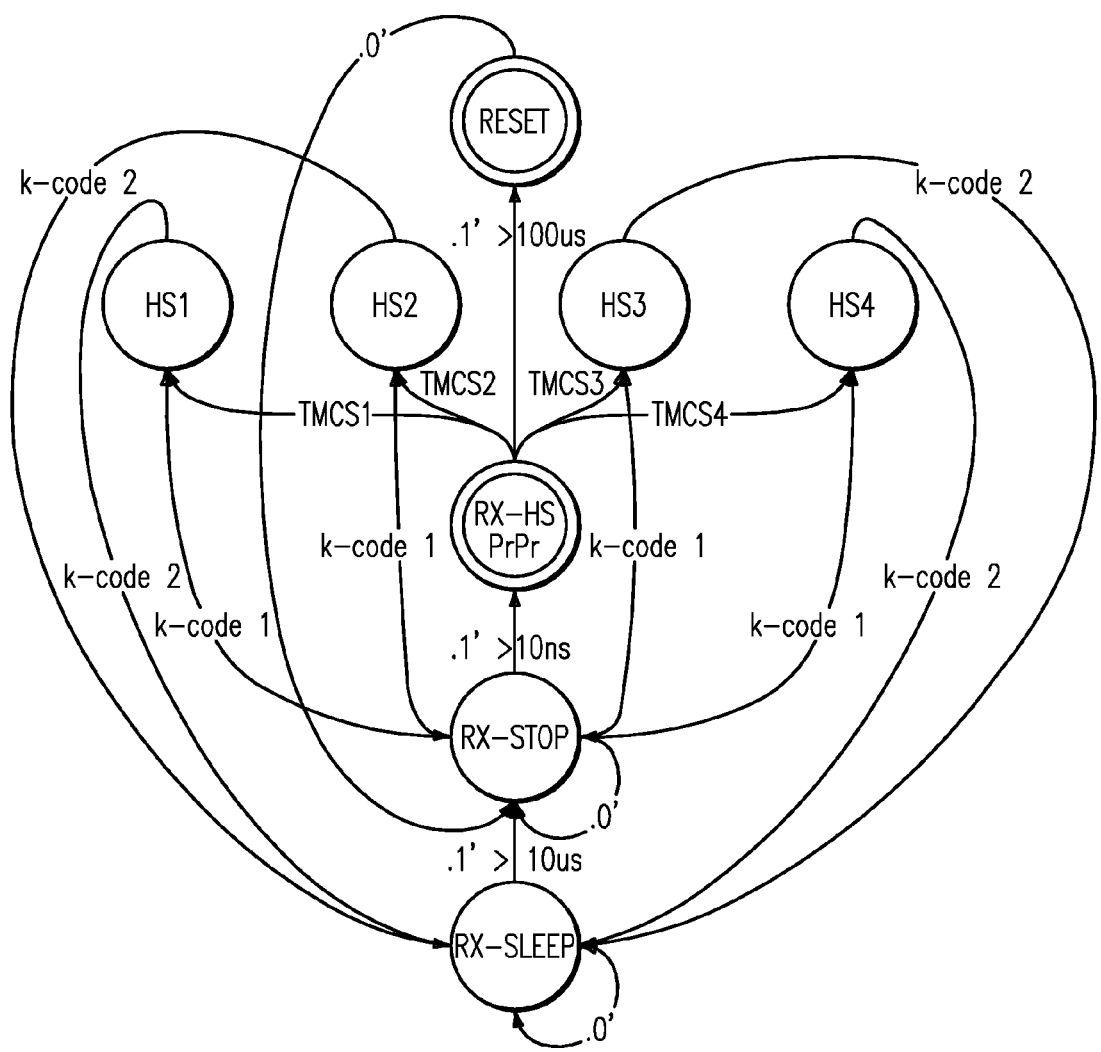
FIG. 7c shows a receiver state diagram according to some embodiments of the present invention.

FIG. 7c shows an RX state diagram for the modes/states shown in FIG. 7a.

FIG. 7d shows an example of transmission mode change signal (TMCS) encoding for the modes/states shown in FIG. 7a.

The transmission mode change signal can be realized in different ways.

The example in FIG. 7d shows a 2 bit sequence with pulse width modulation coding, where the receiver could be implemented with digital counters or analog circuits, and which is very tolerant to frequency variation.

In operation, the transmission mode change signal just announces the HS mode to come (HS1 . . . 4). After the transmission mode change signal, the normal training sequence (e.g. 010101 pattern) will begin.

FIGS. 6a-7c

In summary, by way of example, two alternatives having the basics of requirements for the wired data interface are shown and described herein, including how the different modes are envisaged with resect to data rate, line coding, receiver termination and entry/exit conditions. The format is provided to allow for a basic comparison of the two ways.

These Figures show a possible solution for "the complete picture", i.e. how the different modes can work seamlessly together.

Consistent with that discussed above, assumed priority of mode-transitioning cases is as follows:

HSx=>STOP=>HSx This occurs often, transition needs to be fast

HSx=>STOP=>HSy Occurs less often, transition can be slower

HSx=>SLEEP This transition can be slow

Consistent with that discussed above, the technical details are provided only be way of example.

The Modes/States are as follows:
Two power-down states: SLEEP, STOP
    Both states are basically the same
        No data transmission possible
        Differential '0' on the link
        RX termination OFF
    Only difference is wake-up time
        From STOP to HS approx. 100 ns
        From SLEEP to STOP approx. 1 ms
Up to four 'high-speed' modes: HS1, HS2, HS3, HS4
    All modes are method-wise the same
        Data transmission with 8b10b coding
        Differential signaling with RX termination ON
    Only difference is data rate
        For example HS1: 156 Mbps/HS2: 1248 Mbps/HS3: 2496 Mbps/HS4: 4992 Mbps
    Every implementation must at least provide HS1, other modes are optional The HS1 mode may have a significantly lower data rate than HS2 . . . 4, e.g. 156 Mbps. It is designed to efficiently address low-bandwidth use cases. Due to relatively low frequency, it is expected that receiver data recovery can be implemented with low power consumption. The transmitter phase locked loop should also consume less power than in other HS modes.

Implementation of the Basic Modules

By way of example, and consistent with that described herein, the basic functionality of the modules 10a, 10b, 10c, 20a, 20b may be configured and implemented using hardware, software, firmware, chipset or a combination thereof, although the scope of the invention is not intended to be limited to any particular embodiment thereof. In a typical software implementation, the modules 10a, 10b, 10c, 20a, 20b would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology now known or later developed in the future. Moreover, the scope of the invention is intended to include the modules 10a, 10b, 10c, 20a, 20b being configured as stand alone modules, as shown, or being configured in the combination with other circuitry for implementing another module.

It is understood that the receiver 10 and transmitter 20 may also include other modules, circuits, devices that do not form part of the underlying invention per se. The functionality of the other modules, circuits, device that do not form part of the underlying invention are known in the art and are not described in detail herein.

THE SCOPE OF THE INVENTION

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Even if the exemplary embodiment of the present invention is broadly described in the wired data interface environment, it should be understood and appreciated by a person skilled in the art that the exemplary description of the invention can be applied to other high-speed serial communication technology systems, such as the mobile industry processor interface (MIPI) environment.

Further, the invention might not only be applicable when a device changes from an active to an idle mode but for all changes like channel switching or system initialization that are requiring data rate adaptation.

What is claimed is:

1. A method comprising:
receiving in an apparatus a high-speed serial data signal over a physical link transmitted using a non-return-to-zero coding scheme;
receiving in the apparatus a transmission mode change signal transmitted using a return-to-zero coding scheme with sequential information about a change in a data transmission mode of the apparatus; and
switching the data transmission mode of the apparatus based at least partly on the sequential information.

2. A method according to claim 1, wherein the data transmission mode comprises at least one low-power mode where no data transmission is possible and the apparatus is powered down.

3. A method according to claim 2, wherein the at least one low-power mode comprises two different power down states, each having different wake-up times.

4. A method according to claim 2, wherein the at least one low-power mode comprises a stop state that is an intermediate power saving mode which can be entered from and exited to one or more of several high speed modes.

5. A method according to claim 4, wherein the stop state can be entered from and exited to the one or more of several high speed modes without the transmission mode change signal.

6. A method according to claim 4, wherein the stop state can be entered from and exited to the one or more of several high speed modes by the apparatus by observing a line state.

7. A method according to claim 1, wherein the data transmission mode comprises at least one high speed mode where data transmission is possible and the apparatus is on.

8. A method according to claim 7, wherein the at least one high speed mode comprises several high speed modes, each having different data transmission rates.

9. A method according to claim 1, wherein the change in the data transmission mode depends on a bit sequence transmitted in transmission mode change signals.

10. A method according to claim 1, wherein the method comprises coupling the apparatus via the physical link to an optical receiver that forms part of an optical link.

11. A method according to claim 10, wherein the method comprises decoding the transmission mode change signal with the optical receiver.

12. A method according to claim 1, wherein the change comprises one or more of the following transitions:
changing from a RESET state to a STOP state;
changing from the STOP state to a high speed state if a logical line state goes to a pre-defined logical value, comprising a logical '1' signal; or
the HS state to the STOP or RESET state when a logical value, comprising a logical '0' or '1' signal, is longer than a specified time.

13. A method according to claim 12, wherein a target state indicated by the transmission mode change signal is stored.

14. A method according to claim 12, wherein the specified time is defined to be longer than a maximum run length of a used line coding.

15. A method according to claim 1, wherein one or more hardware settings in the apparatus are changed based at least partly on the sequential information contained in the transmission mode change signal.

16. A method according to claim 15, wherein the one or more hardware settings comprise a setting for adjusting a sensitivity of the apparatus.

17. A method according to claim 1, wherein the transmission mode change signal is transmitted with a signal based at least partly on a type of pulse width modulation coding.

18. A method according to claim 1, wherein the method further comprises implementing the method via a computer program running in one or more modules in the apparatus.

19. A system comprising:
a transmitter having one or more modules configured to provide a high-speed serial data signal over a physical link transmitted using a non-return-to-zero coding scheme, and to provide a transmission mode change signal transmitted using a return-to-zero coding scheme with sequential information about a change in a data transmission mode; and
a receiver having one or more modules configured to receive the high-speed serial data signal and the transmission mode change signal, and to switch the data transmission mode of the receiver based at least partly on the sequential information.

20. A system according to claim 19, wherein the data transmission mode comprises at least one low-power mode where no data transmission is possible and the receiver is powered down.

21. A system according to claim 19, wherein the receiver is coupled via the physical link to an optical receiver that forms part of an optical link, and the transmitter is coupled to an optical transmitter that forms part of the optical link.

22. An apparatus comprising:
one or more modules configured to receive a high-speed serial data signal over a physical link transmitted using a non-return-to-zero coding scheme and a transmission mode change signal transmitted using a return-to-zero coding scheme with sequential information about a change in a data transmission mode of the apparatus; and also configured to switch the data transmission mode of the apparatus based at least partly on the sequential information.

23. An apparatus according to claim 22, wherein the data transmission mode comprises at least one low-power mode where no data transmission is possible and the apparatus receiver is powered down.

24. An apparatus according to claim 23, wherein the at least one low-power mode comprises two different power down states, each having different wake-up times.

25. An apparatus according to claim 23, wherein the at least one low-power mode comprises a stop state that is an intermediate power saving mode which can be entered from and exited to one or more of several high speed modes.

26. An apparatus according to claim 22, wherein the data transmission mode comprises at least one high speed mode where data transmission is possible and the apparatus is on.

27. An apparatus according to claim 26, wherein the at least one high speed mode comprises several high speed modes, each having different data transmission rates.

28. An apparatus according to claim 22, wherein the change in the data transmission mode depends on a bit sequence transmitted in transmission mode change signals.

29. An apparatus according to claim 22, wherein the one or more modules are configured to couple the apparatus to an optical receiver that forms part of an optical link.

30. An apparatus according to claim 29, wherein the one or more modules are configured to decode the transmission mode change signal with the optical receiver.

31. An apparatus according to claim 22, wherein one or more hardware settings of the apparatus are changed based on the sequential information contained in the transmission mode change signal.

32. An apparatus according to claim 31, wherein the one or more hardware settings comprise a setting for adjusting a sensitivity of the apparatus.

33. An apparatus according to claim 22, wherein the transmission mode change signal is received with a signal based at least partly on a type of pulse width modulation coding.

34. An apparatus according to claim 22, wherein the apparatus comprises one or more digital counters or analog circuits for processing the transmission mode change signal.

35. An apparatus according to claim 22, wherein the apparatus forms part of a data interface implementation, comprising a mobile system such a cellular telephone, handheld computer or digital camera.

36. An apparatus according to claim 22, wherein the apparatus forms part of a chip that is integrated into a universal serial bus controller.

37. An apparatus comprising:
one or more modules configured to provide a high-speed serial data signal over a physical link transmitted using a non-return-to-zero coding scheme; and also configured to provide a transmission mode change signal transmitted using a return-to-zero coding scheme with sequential information about a change in a data transmission mode so as to enable a receiver of the high-speed serial data signal being provided to switch the data transmission mode of the receiver based at least partly on the sequential information.

38. An apparatus according to claim 37, wherein the data transmission mode comprises at least one low-power mode where no data transmission is possible and the receiver is powered down.

39. An apparatus according to claim 38, wherein the at least one low-power mode comprises two different power down states, each having different wake-up times.

40. An apparatus according to claim 37, wherein the data transmission mode comprises at least one high speed mode where data transmission is possible and the receiver is on.

41. An apparatus according to claim 40, wherein the at least one high speed mode comprises several high speed modes, each having different data transmission rates.

42. An apparatus according to claim 37, wherein the change in the data transmission mode depends on a bit sequence transmitted in transmission mode change signals.

43. An apparatus according to claim 37, wherein the one or more modules are configured to couple via an optical transmitter to an optical link.

44. An apparatus according to claim 43, wherein the optical transmitter provides the transmission mode change signal for decoding by an optical receiver coupled to the receiver.

45. An apparatus according to claim 37, wherein the transmission mode change signal is transmitted with a signal based at least partly on a type of pulse width modulation coding.

46. An apparatus according to claim 37, wherein the apparatus forms part of an data interface implementation, comprising a mobile system such a cellular telephone, handheld computer or digital camera.

47. A computer-readable storage medium having computer executable components that, when executed by a computer, perform a method comprising: receiving in an apparatus a high-speed serial data signal over a physical link transmitted using a non-return-to-zero coding scheme; receiving in the apparatus a transmission mode change signal transmitted using a return-to-zero coding scheme with sequential information about a change in a data transmission mode of the apparatus; and switching the data transmission mode of the apparatus based at least partly on the sequential information.

48. Apparatus comprising:
means for receiving in the apparatus a high-speed serial data signal over a physical link transmitted using a non-return-to-zero coding scheme and for receiving a transmission mode change signal transmitted using a return-to-zero coding scheme with sequential information about a change in a data transmission mode of the apparatus; and
means for switching the data transmission mode of the apparatus based at least partly on the sequential information.

* * * * *

UNITED STATES PATENT AND TRADEMARK OFFICE
CERTIFICATE OF CORRECTION

| | | |
|---|---|---|
| PATENT NO. | : 8,170,420 B2 | Page 1 of 1 |
| APPLICATION NO. | : 12/206231 | |
| DATED | : May 1, 2012 | |
| INVENTOR(S) | : Schorpp et al. | |

It is certified that error appears in the above-identified patent and that said Letters Patent is hereby corrected as shown below:

Claim 23, col. 12, line 25 delete "receiver".

Signed and Sealed this
Third Day of July, 2012

David J. Kappos
*Director of the United States Patent and Trademark Office*